(12) United States Patent
Harvey et al.

(10) Patent No.: US 8,378,052 B2
(45) Date of Patent: Feb. 19, 2013

(54) COMPOSITION CAPABLE OF RADIATION ACTIVATED CATALYSIS AND RADIATION CURABLE URETHANE CONTAINING THE COMPOSITION

(75) Inventors: Raymond S. Harvey, Worthington, OH (US); Thomas M. Moy, Hilliard, OH (US); Gary M. Carlson, Dublin, OH (US)

(73) Assignee: Ashland Licensing and Intellectual Property LLC, Dublin, OH (US)

( * ) Notice: Subject to any disclaimer, the term of this patent is extended or adjusted under 35 U.S.C. 154(b) by 28 days.

(21) Appl. No.: 12/879,117

(22) Filed: Sep. 10, 2010

(65) Prior Publication Data

US 2010/0326593 A1 Dec. 30, 2010

Related U.S. Application Data

(62) Division of application No. 11/586,501, filed on Oct. 26, 2006.

(51) Int. Cl.
*C08G 18/08* (2006.01)
(52) U.S. Cl. ............... 528/58; 528/48; 528/49; 528/55; 528/76; 528/75; 528/80; 528/85

(58) Field of Classification Search .................... 522/90, 522/93, 95, 92, 96, 97, 98; 528/48, 49, 55, 528/58, 75, 76, 80, 85
See application file for complete search history.

(56) References Cited

U.S. PATENT DOCUMENTS

| | | | |
|---|---|---|---|
| 5,151,454 A * | 9/1992 | Goto et al. | 522/93 |
| 6,548,615 B1 * | 4/2003 | Groth et al. | 528/48 |
| 2005/0119366 A1 * | 6/2005 | Moy et al. | 522/173 |

* cited by examiner

*Primary Examiner* — Michael L Leonard
(74) *Attorney, Agent, or Firm* — Mark Montana

(57) ABSTRACT

A composition capable of radiation activated catalysis is provided. The composition comprises a metal compound, a mercapto compound and an olefinic compound. Radiation curable urethane compositions comprising the disclosed composition are also provided. The radiation curable urethane compositions comprise the disclosed composition, a hydroxyl compound and an isocyanate compound. Activation of the composition by radiation in a urethane formulation provides for an efficient method of curing the urethane composition. Coating and adhesive compositions comprising the radiation curable urethane compositions are also provided. In addition, methods for coating and bonding substrates are disclosed.

14 Claims, No Drawings

COMPOSITION CAPABLE OF RADIATION ACTIVATED CATALYSIS AND RADIATION CURABLE URETHANE CONTAINING THE COMPOSITION

CROSS REFERENCE TO RELATED APPLICATIONS

This application is a divisional of U.S. patent application Ser. No. 11/586,501, filed on Oct. 26, 2006, presently pending, which is incorporated herein by reference.

TECHNICAL FIELD

The present disclosure relates to a composition capable of radiation activated catalysis and a radiation curable urethane composition containing the disclosed composition. The present disclosure also relates to coating and adhesive compositions comprising the radiation curable urethane composition and methods of using the coating and adhesive compositions.

The radiation curable urethane composition is useful in applications where it is desirable for a urethane composition to remain uncured for long periods of time but then can be rapidly cured upon exposure to radiation. The radiation curable composition offers advantages over traditional urethane compositions which can prematurely cure over time (short pot life). Slow cure can increase urethane pot life but often leads to unacceptably long cure times. The radiation curable urethane of the present disclosure provides long pot life and on-demand curing. The urethane composition offers distinct advantage in applications such as adhesives for flexible packaging and coating applications.

BACKGROUND

Urethanes are produced by the reaction of hydroxyl compounds with isocyanates. The reactions are typically catalyzed with a tin or bismuth catalyst. When the hydroxyl and isocyanate compounds are mixed in the presence of the catalyst, the reaction proceeds rapidly to form a cured urethane product. This rapid curing of the urethane requires that the urethane composition be used quickly before the urethane cures leading to short working times (pot life). Lesser amounts of catalyst can be utilized to lengthen the time it takes for the urethane composition to cure which in turn allows for longer pot life for the composition. This approach can lengthen the cure time such that it slows the production of products that utilize the urethane compositions. Ideally, a urethane composition should be storable and usable for a long period then curable on demand.

Approaches that passivate the curing catalyst with a passivating agent that can be subsequently neutralized are described in U.S. Pat. Nos. 4,788,083, 5,478,790, 6,348,121 and 6,548,615. In this approach, neutralization of the catalyst passivator activates the catalyst so that the urethane composition can cure. The specific passivating agent and the mechanism for neutralizing the passivator determine the rate at which a urethane composition will cure.

If the passivating agent is not effective enough, the urethane can cure prematurely. If the mechanism for neutralizing the passivating agent is too slow, then the urethane can cure too slowly. Ideally, the passivator is effective in inhibiting the catalyst activity for long periods and the passivator should be capable of being neutralized quickly so that the maximum amount of catalyst is available immediately for a fast cure time.

SUMMARY

The present disclosure relates to a composition capable of radiation activated catalysis which comprises a metal compound, a mercapto compound and an olefinic compound. The present disclosure also involves a catalyst that is effectively passivated yet is rapidly activated by radiation. This catalyst is ideal for urethane applications that often require on-demand curing performance.

The disclosure also relates to a radiation curable urethane comprising the radiation activated catalyst. Activation of the catalyst by radiation in a urethane formulation provides for an efficient method of curing the urethane composition.

The disclosure further relates to coating and adhesive compositions comprising the radiation curable urethane composition. In addition, methods for coating and bonding substrates are disclosed.

Still, other objects and advantages of the present disclosure will become reading apparent by those skilled in the art from the following detailed description, wherein it is shown and described only in the preferred embodiments, simply by way of illustration of the best mode. As will be realized, the disclosure is capable of other and different embodiments, and its several details are capable of modifications in various obvious respects, without departing from the disclosure. Accordingly, the description is to be regarded as illustrative in nature and not as restrictive.

DETAILED DESCRIPTION AND VARIOUS MODES

The disclosed composition capable of radiation activated catalysis contains a metal compound, a mercapto compound and an olefinic compound. The metal compound alone is capable of functioning as a catalyst in various reactions including the reaction between a hydroxyl compound and an isocyanate compound to form a cure urethane composition. The mercapto compound in the catalyst composition acts to passivate the metal compound by inhibiting its catalytic activity. The catalytic activity of the passivated metal compound can be restored by exposing the disclosed composition to radiation. The radiation can be actinic radiation such as UV radiation or e-beam radiation. The radiation causes the olefinic compound to react with the mercapto compound in a thiolene reaction which neutralizes the passivating effect of the mercapto compound allowing the metal compound to become fully active as a catalyst. This allows compositions such as a two-part urethane composition to cure rapidly due to the radiation induced release of the passivated catalyst.

The metal compound in the disclosed composition can be any compound that can provide a catalytic effect in a reaction sequence. The catalytic activity of the metal compound is also passivated by the presence of a mercapto compound. The olefinic compound can be any olefinic compound that can react with a mercapto compound in a thiolene type reaction.

Typically, the metal compound is a tin compound, a bismuth compound, a germanium compound, a cobalt compound, a manganese compound or a combination of these metal compounds. More typically, the metal compound is selected from dibutyltindilaurate, stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin acetate, di-alkyl tin dicarboxylates, dimethyl tin dichloride, bismuth tricarboxylates, bismuth nitrate, bismuth halides, bismuth sulfide, basic bismuth dicarboxylates, and mixtures thereof. Typically, the catalyst concentration ranges from about 0.005 to about 0.5 weight % based on the total amount of the composition.

In the disclosed composition, the mercapto compounds can be any mercapto compounds that can passivate the catalytic activity of the metal compound and that can react with an olefinic compound. Typically, the mercapto compound is selected from trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid and esters thereof, thiophenol, thio acetic acid, 2-mercapto ethanol, 1,4-butanedithiol, 2,3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,5,6-tetrafluorothiophenol, cyclohexyl mercaptan, methylthioglycolate, various mercapto pyridines, dithioerythritol, 6-ethoxy-2-mercaptobenzothiazole, d-limonene dimercaptan γ-mercapto silane and mixtures thereof.

Typically, the molar ratio of mercapto groups to metal in the metal catalyst ranges from about 2:1 to about 500:1.

The olefinic compound in the disclosed composition can be an olefinic compound that can react with a mercapto compound in a thiolene type reaction. Non-limiting examples include diallyl phthalate, acrylic acid, methacrylic acid alkyl acrylate, alkyl methacrylate, acrylamide and mixtures thereof. The molar ratio of the olefinic groups in the olefin to the mercapto groups in the mercaptan ranges from about 0.5:1 to about 2:1.

The radiation activated catalyst is useful in systems requiring the catalyst to remain inactive until needed. When needed the catalyst can be activated with radiation and the activated catalyst can quickly catalyze the desired reaction. An example of such a system is a urethane type composition which when combined with the radiation activated catalyst forms a radiation curable urethane composition.

Typically, urethane compositions contain two reactant parts which include a hydroxyl compound component and an isocyanate compound component. The hydroxyl component typically contains a metal compound catalyst which catalyzes the reaction between the isocyanate compound and hydroxyl compound. Often it is desirable not to have the hydroxyl compound and isocyanate react immediately so that the urethane composition can be utilized for its desired application. After the urethane composition is applied as needed, it is then desirable to cure the urethane quickly. The disclosed radiation activated catalyst fills this need by allowing the urethane components to be mixed with minimal curing and then the urethane components can be cured rapidly by radiation when desired.

The disclosed radiation curable urethane composition contains the radiation activated catalyst, a hydroxyl compound, an isocyanate compound and optionally other customary components such as extenders, solvents, fillers and the like.

The hydroxyl compound is not limited and can include diol, triols, tetrols and mixtures thereof. Typically, the hydroxyl compound is a polyhydroxy compound, a polyhydroxy oligomer or a polyhydroxy polymer.

Hydroxy compounds useful in the radiation curable urethane compositions include hydroxypolyesters, hydroxypolyethers, hydroxypolythioesters, hydroxypolyacetals, hydroxypolycarbonates, dimeric fatty alcohols, esteramides, polyetherpolyols, polyesterpolyols, polycarbonatepolyols, ethylene glycol, triethylene glycol, tetraethylene glycol, 1,2- and 1,3-propanediol, 1,4- and 1,3-butanediol, 1,6-hexanediol, 1,8-octanediol, neopentyl glycol, 1,4-bis-(hydroxymethyl)-cyclohexane, bis-(hydroxymethyl)-(tricycle-[5.2.1.0$^{2.6}$]-decane or 1,4-bis-(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetra-bromobisphenol A, glycerol, trimethylolpropane, 1,2,6-hexanetriol, 1,2,4-butanetriol, pentaerythritol, quinitol, mannitol, sorbitol, methylglycoside 1,4:3,6-dianhydrohexitol and mixtures thereof.

The hydroxy compound also may be a hydroxy urethane prepolymer which can be a polyol or monomeric alcohol provided from a polyester, polyether, polyurethane, polysulfide, or the like. Ethylenic unsaturation even can be provided by the monomeric alcohol or polyol itself or can be reacted onto a polyol or monomeric alcohol subsequently by conventional reaction schemes, if such unsaturation is desirable. Conventional reaction schemes call for the reaction of a monomeric alcohol or polyol with, for example, acrylic acids, acrylyl halides, acrylic-terminated ethers, acrylic or methacrylic anhydrides, isocyanate-terminated acrylates, epoxy acrylates, and the like. Further reaction schemes for formulating hydroxy urethane prepolymers include reaction of a hydroxy-acrylate monomer, hydroxy methacrylate monomer, or an allyl ether alcohol with a cyclic anhydride such as, for example, the anhydrides: maleic, phthalic, succinic, norborene, glutaric, and the like. Unsaturated polyol-polyesters optionally then can be reacted with a suitable oxirane, such as, for example, ethylene oxide, propylene oxide, glycidyl acrylate, allyl glycidyl ether, alpha-olefin epoxides, butyl glycidyl ether, and the like. Suitable allyl alcohols include, for example, trimethylolpropane monoallyl ether, trimethylol propane diallyl ether, allyl hydroxylpropylether, and the like.

The isocyanate compound is not limited and can include aromatic, aliphatic or, mixed aromatic/aliphatic isocyanates and polymeric isocyanates. Further, alcohol-modified and other modified isocyanate compositions find utility in the disclosure. Multi-isocyanates preferably will have from about 2-4 isocyanate groups per molecule for use in the coating composition and adhesive composition of the present disclosure. Suitable multi-isocyanates for use in the present disclosure include, for example, hexamethylene diisocyanate, 4,4'-toluene diisocyanate (TDI), diphenylmethane diisocyanate (MDI), polymethyl polphenyl isocyanate (Polymeric MDI or PAPI), m- and p-phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl)cyclohexane (H6XDI), dicyclohexylmethane diisocyanate (H12MDI), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present disclosure. The ratio of isocyanate equivalents of the polyisocyanate crosslinking agents to the hydroxyl groups from the hydroxy resinous materials can range from about 1:2 on up to about 2:1.

The precise intended application of the coating composition or adhesive composition often will dictate this ratio or isocyanate index.

The radiation curable urethane can be utilized as a coating composition or an adhesive composition to coat and/or to bond substrates. The radiation curable urethane composition may contain solvents, fillers, extenders and other functional additives depending upon the specific application. Solvents include ketones such as MEK and MIBK, aromatic solvents such a toluene and xylene, aliphatic solvents such as hexane and cyclohexane, esters such as ethyl acetate and other solvents such as THF. The solvents may be used in an amount from about 20% to about 80% by weight of the final composition. The radiation curable urethane composition additionally can contain opacifying pigments and inert extenders such as, for example, titanium dioxide, zinc oxide, clays such as kaolinite clays, silica, talc, carbon or graphite (e.g. for conductive coatings), and the like. Additionally, the compositions can contain tinctorial pigments, corrosion-inhibiting pigments, and a variety of agents typically found in coating compositions. Such additional additives include, for example, surfactants, flow or leveling agents, pigment dispersants, and the like.

The coating method involves applying a coating composition comprising the disclosed radiation curable urethane to the surface of a substrate or article then irradiating the coated substrate or coated article with radiation to cure the coating composition containing the UV curable urethane. The type or composition of the article or substrate is not limited. The article or substrate can be glass, wood, metal, plastic, ceramic, and stone.

Specific examples of substrates include iron, steel, aluminum, copper, galvanized steel, zinc, and the like. Additionally, the coating composition can be applied to wood, fiberboard, RIM (reaction injection molding urethanes), SMC (sheet molding compound), vinyl, acrylic, or other polymeric or plastic material, paper, textile, leather and the like. Since the coating compositions can be cured at room temperature, thermal damage to thermally-sensitive substrates is not a limitation on use of the coating compositions of the present disclosure. However, heating at conventional curing temperatures may even be practiced on occasion. It should be understood that the present disclosure can be applied to primers, intermediate coats, and top coats, substantially independent of film thickness. In fact, the present disclosure may provide the ability to formulate a single coating which can function both as a primer and as a top coat (unicoat system).

The present disclosure also involves any substrate or article produced by the coating method described above.

The disclosure involves adhesive compositions comprising the radiation curable urethane. The adhesive composition is not limited and can be any formulation where radiation curing techniques can be utilized. The fast curing afforded by the radiation curable formulation is desirable in many urethane adhesive applications that have traditionally required long cure times. This can lead to higher production rates and lower production costs.

The disclosed adhesive composition can be used to bond substrates together. The method involves applying the disclosed radiation curable urethane adhesive composition to at least one of at least two substrates, then joining the at least two substrates with the radiation curable urethane adhesive composition between the substrates forming a laminate then irradiating the adhesive composition with radiation to cure the adhesive composition thus bonding the substrates. Alternatively, the radiation curable adhesive composition can be applied to one of the at least two substrates then irradiated followed by jointing the second substrate to the first substrate with the irradiated composition in between. Multiple substrates can also be bonded with this technique. Examples include multilayer flexible laminated packaging.

The substrates can be and rigid and/or flexible material. If the radiation curable composition is irradiated after the two substrates are jointed, one of the substrates should be at least partially transparent to radiation so that the adhesive composition can cure. If the radiation curable composition is irradiated before joining the substrates then the substrates do not need to be transparent to radiation. The substrates can be any type of material and typically include isocyanate foam, plastic, fiberglass, polystyrene foam, flexible plastic, rigid plastic, plastic packaging glass, wood, metal, plastic, ceramic, stone, paper, textile, leather, iron, steel, aluminum, copper and combinations thereof.

Specific types of plastic, both rigid and flexible, include polyethylene (PE), polypropylene (PP), PE/PP, low density PE, linear low density PE, high density PE polyisobutene, polyvinylchloride, polyvinylacetate copolymer (EVA), nylon, polyester, mylar, polystyrene styrenic polymers, polycarbonate, acrylic polymers, acetal polymers, PET polymers, ABS polymers, fluoropolymers, PFTE, HIPS, EVOH, PP/EVOH, polyketones, polyimides, sulfone polymers and polysulfide polymers.

Other examples of substrates include silicon oxide or aluminum oxide coated plastic such as polyester, nylon and PP.

For flexible substrates, substrate thickness can range from about 0.1 mil to about 50 mil and more typically from about 1 mil to about 20 mil.

The disclosure also involves articles bonded together with the adhesive composition such as laminated products.

The following example is for illustrative purposes only and is not intended to limit the scope of the claims. The example involves producing a laminated flexible packaging utilizing the disclosed composition.

In general, the flexible packaging is produced by compounding the components of the urethane adhesive with a mixing device such as a standard mixing blade or a static mixer. Typically, the compounded urethane adhesive is applied to a laminating head and the adhesive is transferred to a flexible substrate. The laminating head is typically set to a temperature from about 25° C. to about 50° C., more typically from about 25° C. to about 45° C. The coat thickness of the adhesive applied onto the substrate is typically from about 0.01 mils to about 0.250 mils, more typically from about 0.03 mils to about 0.175 mils and even more typically from about 0.05 to about 0.150 mils.

After the adhesive is applied to the first flexible substrate (primary film), the first flexible substrate is married to a second flexible substrate (secondary film) with the adhesive layer between the primary and secondary film. The flexible laminate has the layered structure primary film/adhesive/secondary film. This process can be repeated to form a multiple layer laminate. For example, the secondary layer of the flexible laminate about can have urethane adhesive applied to its surface and then a tertiary film can be married to the flexible laminate to form the laminated structure primary film/adhesive/secondary film/adhesive/tertiary film. This process can be repeated to achieve any desired number of layers in any desired order of flexible substrates (films).

Once the at least two flexible substrates are married together, to form a flexible laminate, the laminate is passed through a nip between two rolls under pressure. One or both of the rolls may be heated. The nip pressure typically is about 0.1 pli to about 100 pli. One or both of the rolls may be heated to about 25° C. to about 100° C., more typically from about 25° C. to about 60° C. and even more typically from about 25° C. to about 50° C.

For multiple layer laminates (more than 2 flexible substrates) the laminate can be passed through the nip for each succeeding layer of adhesive and flexible substrate or the entire multiple flexible laminate can be formed first then passed through the nip. The urethane adhesive is then allowed to cure by exposure to radiation. Exposure to radiation causes the mercaptan and olefinic compound to react thus eliminating the blocking effect of the mercaptan. The de-blocked catalyst can then quickly cure the urethane adhesive.

The flexible substrate coated with the urethane adhesive is subjected to UV radiation before the nipping process. Some heat may be applied to facilitate adhesive wet out. The following non-limiting example illustrates one embodiment of the disclosure.

Laminated packaging is prepared using the general procedures described above. Two laminated packaging examples are prepared and include an example (Example 1) which is produced with a commercially available urethane adhesive (Rohm and Haas C33/1390®) and an example (Example 2) produced with a urethane adhesive containing the disclosed composition. Processing conditions for the laminations and the flexible substrates (films) are given below in Table 1. The urethane adhesive formulation for Example 2 is given in Table 2.

TABLE 1

Process conditions for producing the flexible laminated packaging.

| Process Parameters | |
|---|---|
| Application roll temperature | 35° C. |
| NIP roll temperature | 45° C. |
| Line speed | 40 fpm |
| Adhesive coat thickness | 0.11 mils |
| Flexible substrates (films) | |
| Primary film | 48 g PET |
| Secondary film | 2.0 mil LDPE |

TABLE 2

Urethane Adhesive Formulation used for Example 2

| Urethane Formulation | 2 |
|---|---|
| Polyisocyanate, wt % | |
| Hexamethylene Diisocyanate Trimer | 100 |
| Polyfunctional Curative, wt % | |
| Polypropylene glycol | 57.75 |
| Caster Oil | 35.4 |
| Polypropylene Glycol Trimer | 4.9 |
| Dibutyl Tin Dilaurate (Catalyst) | 0.04 |
| Mercapto Silane (Blocking Agent) | 0.32 |
| Diallyl Phthalate (Olefinic Compound) | 1.50 |

A Nordmeccanica® Super Simplex SL Laminator is used to laminate the films. The two parts of the urethane composition (polyisocyanate and polyfunctional curative) are mixed in the ratio 1:1.9 using meter-mix equipment before coating and lamination. The laminated flexible packaging for the two examples are prepared as described above except Example 2 containing the disclosed composition is exposed to UV radiation just before the nips. The adhesive in Example 2 (disclosed composition) cures in less than one day. In contrast, the adhesive in Example 1 takes 7 days to cure. These results demonstrate the ability of the disclosed composition to provide on-demand performance.

Next, the urethane compositions described above (Examples 1 and 2) are used as coatings. The urethane compositions are coated on aluminum panels at a film thickness of 5 mil. Example 2 is cured with UV radiation immediately after coating. Both samples are tested 24 hours after coating. The samples are tested by cross-hatch testing using Scotch 600® tape and rated by ASTM D3359. The results are given in Table 3.

TABLE 3

Coating results for Examples 1 and 2.

| Example 2 (UV Cured) | Example 1 |
|---|---|
| 2B (15-35%) | 0B (100%) |
| 1B (35-65%) | 0B (100%) |
| 1B (35-65%) | 0B (100%) |
| MEK double rubs >200 | MEK double rubs 150-180 |

The results show that the discussed composition provides good performance as a coating composition and gives good performance relative to the non-radiation cured (Example 1) composition.

Next, the disclosed urethane composition described above (Example 2) is used to laminate wood (pine) substrates and sheet molded composite substrates (SMC) (Ashland Phase Beta). The urethane composition is applied to one side of two substrates, irradiated with UV radiation then the substrates are joined with the urethane composition in between. The joined substrates are pressed at 125 psi for 48 hours. The wood substrate showed an average lap shear strength of 337 psi and the SMC substrates showed a strength of 497 psi. The results demonstrate that the disclosed composition can be used in as an adhesive in laminating rigid substrates.

The term "comprising" (and its grammatical variations) as used herein is used in the inclusive sense of "having" or "including" and not in the exclusive sense of "consisting only of". The terms "a" and "the" as used herein are understood to encompass the plural as well as the singular.

The foregoing description illustrates and describes the present disclosure. Additionally, the disclosure shows and describes only the preferred embodiments of the disclosure, but, as mentioned above, it is to be understood that it is capable of changes or modifications within the scope of the concept as expressed herein, commensurate with the above teachings and/or skill or knowledge of the relevant art. The embodiments described hereinabove are further intended to explain best modes known of practicing the invention and to enable others skilled in the art to utilize the disclosure in such, or other, embodiments and with the various modification required by the particular applications or uses disclosed herein. Accordingly, the description is not intended to limit the invention to the form disclosed herein. Also, it is intended that the appended claims be construed to include alternative embodiments.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

We claim:

1. A radiation curable urethane composition comprising
a) a composition capable of radiation activated catalysis comprising a metal compound having catalytic activity, a mercapto compound which passivates the metal compound by inhibiting the catalytic activity of the metal compound; and an olefinic compound which reacts with the mercapto compound wherein the reaction between the mercapto compound and the olefinic compound is caused by the radiation;

b) a hydroxyl compound; and c) an isocyanate compound.

2. The composition as claimed in claim 1, wherein the metal compound is selected from the group consisting of a tin compound, a bismuth compound, a germanium compound, a cobalt compound, a manganese compound and mixtures thereof.

3. The composition as claimed in claim 1, wherein the mercapto compound is selected from the group consisting of trimethylol propane tri-(3-mercapto propionate), pentaerythritol tetra-(3-mercapto propionate), glycol di-(3-mercapto propionate), glycol dimercapto acetate, trimethylol propane trithioglycolate, mercapto diethyl ether, ethane dithiol, thiolactic acid, mercapto propionic acid, mercapto propionic acid esters, thiophenol, thio acetic acid, 2-mercapto ethanol, 1, 4-butanedithiol, 2,3-dimercapto propanol, toluene-3,4-dithiol, alpha,alpha'-dimercapto-para-xylene, thiosalicylic acid, mercapto acetic acid, dodecane dithiol, didodecane dithiol, di-thio phenol, di-para-chlorothiophenol, dimercapto benzothiazole, 3,4-dimercapto toluene, allyl mercaptan, benzyl mercaptan, 1,6-hexane dithiol, 1-octane thiol, para-thiocresol, 2,3,5,6-tetrafluorothiophenol, cyclohexyl mercaptan, methylthioglycolate, mercapto pyridines, dithioerythritol, 6-ethoxy-2-mercaptobenzothiazole, d-limonene dimercaptan, γ-mercapto silane and mixtures thereof.

4. The composition as claimed in claim 1, wherein the olefinic compound is selected from the group consisting of diallyl phthalate, acrylic acid, methacrylic acid, alkyl acrylate, alkyl methacrylate, acrylamide and mixtures thereof.

5. The composition as claimed in claim 1, wherein the metal compound is selected from the group consisting of dibutyltindilaurate, stannous acetate, stannic oxide, stannous octoate, dibutyltin dioctoate, tin mercaptides, stannous citrate, stannous oxylate, stannous chloride, stannic chloride, tetra-phenyl tin, tetra-butyl tin, tri-n-butyl tin, tri-n-butyl tin acetate, dialkyl tin dicarboxylates, dimethyl tin dichloride, bismuth tricarboxylates, bismuth nitrate, bismuth halides, bismuth sulfide, basic bismuth dicarboxylates, and mixtures thereof.

6. The radiation curable urethane composition as claimed in claim 1, wherein the hydroxyl compound is a polyol.

7. The radiation curable urethane composition as claimed in claim 6, wherein the polyol is an aliphatic polyol.

8. The radiation curable urethane composition as claimed in claim 1, wherein the hydroxyl compound is selected from the group consisting of hydroxypolyester, hydroxypolyethers, hydroxypolythioester, hydroxypolyacetal, hydroxypolycarbonate, dimeric fatty alcohol, esteramide, polyetherpolyol, polyesterpolyol, polycarbonatepolyol, ethylene glycol, triethylene glycol, tetraethylene glycol, 1,2-propanediol, 1,3-propanediol, 1,4-butanediol, 1,3-butanediol, 1,6-hexanediol, 1,8-octanediol, neopentyl glycol, 1,4-bis-(hydroxymethy)-cyclohexane, bis-(hydroxymethyl)-(tricycle-[$5.2.1.0^{2.6}$]-decane, 1,4-bis-(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetra-bromobisphenol A, glycerol, trimethylolpropane, 1,2,6-hexanetriol, 1,2,4-butanetriol, pentaerythritol, quinitol, mannitol, sorbitol, methylglycoside 1,4:3,6-dianhydrohexitol and mixtures thereof.

9. The radiation curable urethane composition as claimed in claim 1, wherein the isocyanate compound is a polyisocyanate.

10. The radiation curable urethane composition as claimed in claim 9, wherein the polyisocyanate is an aliphatic polyisocyanate.

11. The radiation curable urethane composition as claimed in claim 1, wherein the isocyanate compound is selected from the group consisting of hexamethylene diisocyanate, 4,4'-toluene diisocyanate (TDI), diphenylmethane diisocyanate (MDI), polymethyl polphenyl isocyanate (Polymeric MDI or PAPI), m-phenylene diisocyanates, p-phenylene diisocyanates, bitolylene diisocyanate, triphenylmethane triisocyanate, tris-(4-isocyanatophenyl)thiophosphate, cyclohexane diisocyanate (CHDI), bis-(isocyanatomethyl)cyclohexane ($H_6$XDI), dicyclohexylmethane diisocyanate ($H_{12}$MDI), trimethyihexane diisocyanate, dimer acid diisocyanate (DDI), dicyclohexylmethane diisocyanate, dimethyl derivatives of dicyclohexylmethane diisocyanate, trimethyl hexamethylene diisocyanate, lysine diisocyanate, methyl ester of lysine diisocyanate, isophorone diisocyanate, methyl cyclohexane diisocyanate, 1,5-naphthalene diisocyanate, triphenyl methane triisocyanate, xylene diisocyanate, methyl derivatives of xylene diisocyanate, hydrogenated derivatives of xylene diisocyanate, polymethylene polyphenyl isocyanates, chlorophenylene-2,4-diisocyanate and mixtures thereof.

12. A coating composition comprising the radiation curable urethane composition as claimed in claim 1.

13. The composition as claimed in claim 1, wherein the radiation is actinic radiation or e-beam radiation.

14. The composition as claimed in claim 1, wherein the radiation is UV radiation.

* * * * *